(12) United States Patent
Tanaka et al.

(10) Patent No.: US 8,411,243 B2
(45) Date of Patent: Apr. 2, 2013

(54) DISPLAY DEVICE

(75) Inventors: Hironao Tanaka, Kanagawa (JP);
Yoshihiro Sakurai, Kanagawa (JP);
Harumi Okuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/419,923

(22) Filed: Mar. 14, 2012

(65) Prior Publication Data
US 2012/0194776 A1 Aug. 2, 2012

Related U.S. Application Data

(63) Continuation of application No. 12/467,699, filed on May 18, 2009, now Pat. No. 8,208,112.

(30) Foreign Application Priority Data

May 30, 2008 (JP) .................... 2008-142334
Jan. 16, 2009 (JP) .................... 2009-007345

(51) Int. Cl.
*G02F 1/1343* (2006.01)

(52) U.S. Cl. ......... 349/141; 349/139; 349/145; 349/146

(58) Field of Classification Search .......... 349/139–141, 349/145, 146
See application file for complete search history.

(56) References Cited

U.S. PATENT DOCUMENTS

| | | | |
|---|---|---|---|
| 6,747,712 B2 | 6/2004 | Noh et al. | |
| 6,809,789 B2 | 10/2004 | Kim et al. | |
| 7,251,006 B2 | 7/2007 | Ono et al. | |
| 8,208,112 B2 * | 6/2012 | Tanaka et al. | 349/141 |
| 8,243,243 B2 * | 8/2012 | Tanaka | 349/144 |
| 8,248,563 B2 * | 8/2012 | Hsu et al. | 349/139 |
| 2005/0046779 A1 | 3/2005 | Sumi et al. | |
| 2007/0153186 A1 | 7/2007 | Shih et al. | |
| 2007/0153204 A1 | 7/2007 | Kim et al. | |
| 2008/0297710 A1 | 12/2008 | Hsu et al. | |
| 2009/0046234 A1 | 2/2009 | Tanaka | |
| 2009/0296037 A1 * | 12/2009 | Tanaka et al. | 349/143 |
| 2011/0001914 A1 | 1/2011 | Tanaka | |

FOREIGN PATENT DOCUMENTS

| | | |
|---|---|---|
| JP | 2005-196162 | 7/2005 |
| JP | 3793891 | 4/2006 |
| JP | 2006-251534 | 9/2006 |
| JP | 2008-065300 | 3/2008 |

OTHER PUBLICATIONS

Japanese Patent Office, Notification of reasons for refusal issued in connection with Japanese Patent Application No. 2009-007345, mailed Sep. 18, 2012. (5 pages).

* cited by examiner

*Primary Examiner* — Rhonda Peach
(74) *Attorney, Agent, or Firm* — K&L Gates LLP

(57) ABSTRACT

A display device is provided and includes pixel electrodes, each including a plurality of electrode sections which are arranged parallel to each other. Each electrode section is bent approximately in the middle along its extension direction in plan view. The pixel electrodes include a center connection portion adapted to connect together the electrode sections at their bent portions, and include end connection portions adapted to connect together the electrode sections at their end portions, and include protruding portions each of which is formed by extending the end connection portion in such a manner as to protrude from the arranged electrode sections. The display device also includes a substrate on which the pixel electrodes are arranged, an opposed substrate provided to face the side of the substrate on which the pixel electrodes are formed, and a liquid crystal layer filled and sealed between the substrate and opposed substrate.

10 Claims, 17 Drawing Sheets

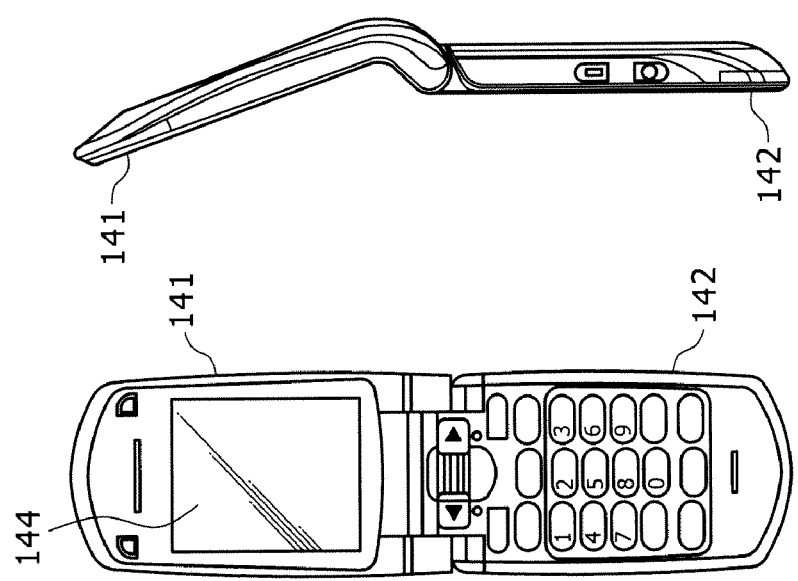
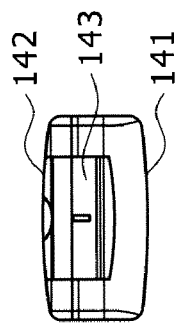
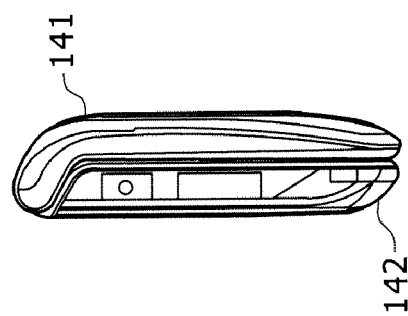
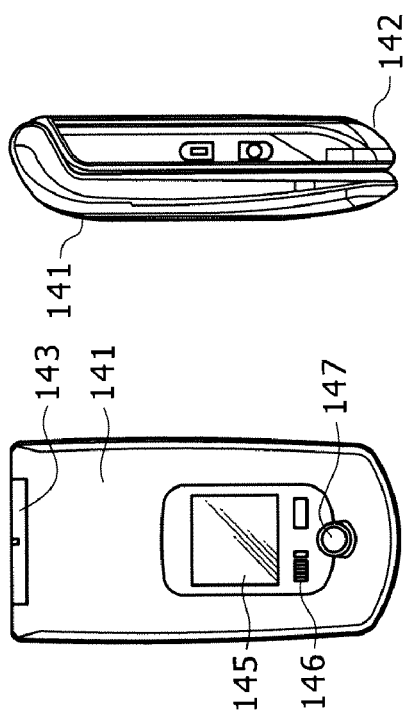
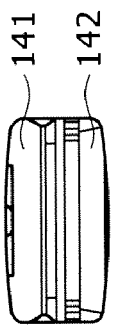
FIG.18A  FIG.18B  FIG.18D  FIG.18C  FIG.18F  FIG.18E  FIG.18G

DISPLAY DEVICE

CROSS REFERENCES TO RELATED APPLICATIONS

The present application is a continuation of U.S. application Ser. No. 12/467,699 filed May 18, 2009, which claims priority to Japanese Patent Application JP 2008-142334 filed in the Japan Patent Office on May 30, 2008 and to Japanese Patent Application JP 2009-007345 filed in the Japan Patent Office on Jan. 16, 2009, respectively, the entire contents of which are being incorporated herein by reference.

BACKGROUND

The present application relates to a display device and more particularly to a display device for driving liquid crystal molecules in lateral field mode.

Lateral field modes for liquid crystal display devices are drawing attention for their capability to provide a wide view angle and high contrast. Of such modes, the fringe field switching mode (FFS) offers improved aperture ratio and transmittance over the in-plane switching (IPS) counterpart.

FIG. 19 is a plan view of major parts illustrating an example of an FFS mode liquid crystal display device. As illustrated in FIG. 19, an FFS mode liquid crystal display device has a plurality of scan lines 203 and a plurality of signal lines 205 disposed in a matrix form on a drive substrate 201. A pixel electrode 209 is provided at each of the intersections between the scan lines 203 and signal lines 205. The pixel electrodes 209 are patterned in the form of comb teeth with a plurality of electrode sections 209a extending along the signal line 205 (or scan line 203).

Further, although not illustrated in FIG. 19, a common electrode 207 is provided below the pixel electrode 209 which is provided on the substrate 201. The common electrode 207 is insulated from the pixel electrode 209 by an insulating film. The common electrode 207 is provided, for example, in the same layer as the scan lines or in a layer above that of the scan and signal lines. The same electrode 207 is disposed at least over the entire surface of a pixel a.

In an FFS mode liquid crystal display device configured as described above, the multi-domain structure adapted to orient liquid crystal molecules m in multiple domains is advantageous for achieving further improved view angle characteristic. In this case, the electrode sections 209a are bent in different directions in the middle along their extension direction as illustrated in FIG. 19 so that each pixel a is divided into two domains. In these domains, the electrode sections 209a extend in different directions. It is preferred in terms of optical characteristics that the two domains be mirror symmetric with respect to the domain boundary portion as a symmetry axis. This allows for the liquid crystal molecules m in the two domains, divided from the single pixel a, to be driven in different rotational directions, thus providing improved view angle characteristic (color shift) for display of shades of gray and white (refer, for example, to U.S. Pat. No. 6,809,789).

It is certainly true that display devices having the above FFS multi-domain structure offer an improved view angle characteristic. However, the following problem has been discovered in such display devices.

If an external pressure (e.g., finger press) is exerted on the display surface of the display device when white is displayed by applying a voltage between the pixel and common electrodes, so-called reverse twisting will occur. This phenomenon causes the liquid crystal molecules in the pixel to rotate in a direction opposite to the direction of the electric field. It has been found that reverse twisting is a contributor to display unevenness (hereinafter referred to as finger press unevenness) and that the display cannot be restored to its original state when left standing.

It is desired to provide a liquid crystal display device having a lateral field multi-domain structure which can completely eliminate finger press unevenness when left standing.

SUMMARY

A display device according to an embodiment for solving the above problem has pixel electrodes arranged on one of a pair of substrates between which a liquid crystal layer is filled. Each of the pixel electrodes includes a plurality of electrode sections which are arranged parallel to each other. Each electrode section is bent approximately in the middle along its extension direction in plan view. In particular, each of the pixel electrodes includes a center connection portion and end connection portions. The center connection portion connects together the electrode sections at their bent portions. The end connection portions connect together the electrode sections at their end portions. Each of the pixel electrodes further includes protruding portions each of which is formed by extending the end connection portion in such a manner as to protrude from the arranged electrode sections.

The display device configured as described above is a lateral field mode display device which includes a plurality of electrode sections arranged parallel to each other. Further, each electrode section is bent approximately in the middle along its extension direction in plan view. As a result, the display device has a multi-domain structure which permits liquid crystal molecules to be driven in different rotational directions. In such a configuration, in particular, each of the pixel electrodes includes a center connection portion and end connection portions. The center connection portion connects together the electrode sections at their bent portions. The end connection portions connect together the electrode sections at their end portions. Each of the pixel electrodes further includes protruding portions each of which is formed by extending the end connection portion in such a manner as to protrude from the arranged electrode sections. This makes it possible to restore the liquid crystal layer to its original orientation by leaving the display device standing even in the event of reverse twisting resulting from the exertion of an external pressure (e.g., pressing by a finger) on the display surface of the display device when the liquid crystal layer is oriented by applying a voltage between the pixel and common electrodes as will be described later in embodiments. It has been found that display unevenness resulting from reverse twisting can be completely eliminated.

As described above, the present application can completely eliminate display unevenness, resulting from reverse twisting, in a liquid crystal display device having a lateral field multi-domain structure by leaving the device standing, thus providing improved display characteristics of the display device. If applied to a display device having a touch panel function which is subjected to external pressure (e.g., finger press) on the display surface, the present application keeps the impact of such external pressure to a minimum in the display.

Additional features and advantages are described herein, and will be apparent from the following Detailed Description and the figures.

BRIEF DESCRIPTION OF THE FIGURES

FIG. 15A is a perspective view as seen from the front, and FIG. 15B is a perspective view as seen from the rear;

FIGS. 18A to 18G are views illustrating a personal digital assistant such as a mobile phone to which an embodiment is applied, and FIG. 18A is a front view of the mobile phone in an open position, FIG. 18B is a side view thereof, FIG. 18C is a front view thereof in a closed position, FIG. 18D is a left side view thereof, FIG. 18E is a right side view thereof, FIG. 18F is a top view thereof, and FIG. 18G is a bottom view thereof.

DETAILED DESCRIPTION

The preferred embodiments will be described below in the following order:

1. First embodiment (example in which space portions of the pixel electrodes are rectangular and protruding portions are provided in two directions)

2. Second embodiment (example in which space portions of the pixel electrodes are rectangular and protruding portions are provided in one direction)

3. Third embodiment (example in which space portions of the pixel electrodes are parallelogramic and protruding portions are provided in two directions)

4. Fourth embodiment (example in which space portions of the pixel electrodes include only obtuse angles and protruding portions are provided in two directions)

5. Fifth embodiment (example in which a light-shielding film is added to the first embodiment)

1. First Embodiment

Figure 1:
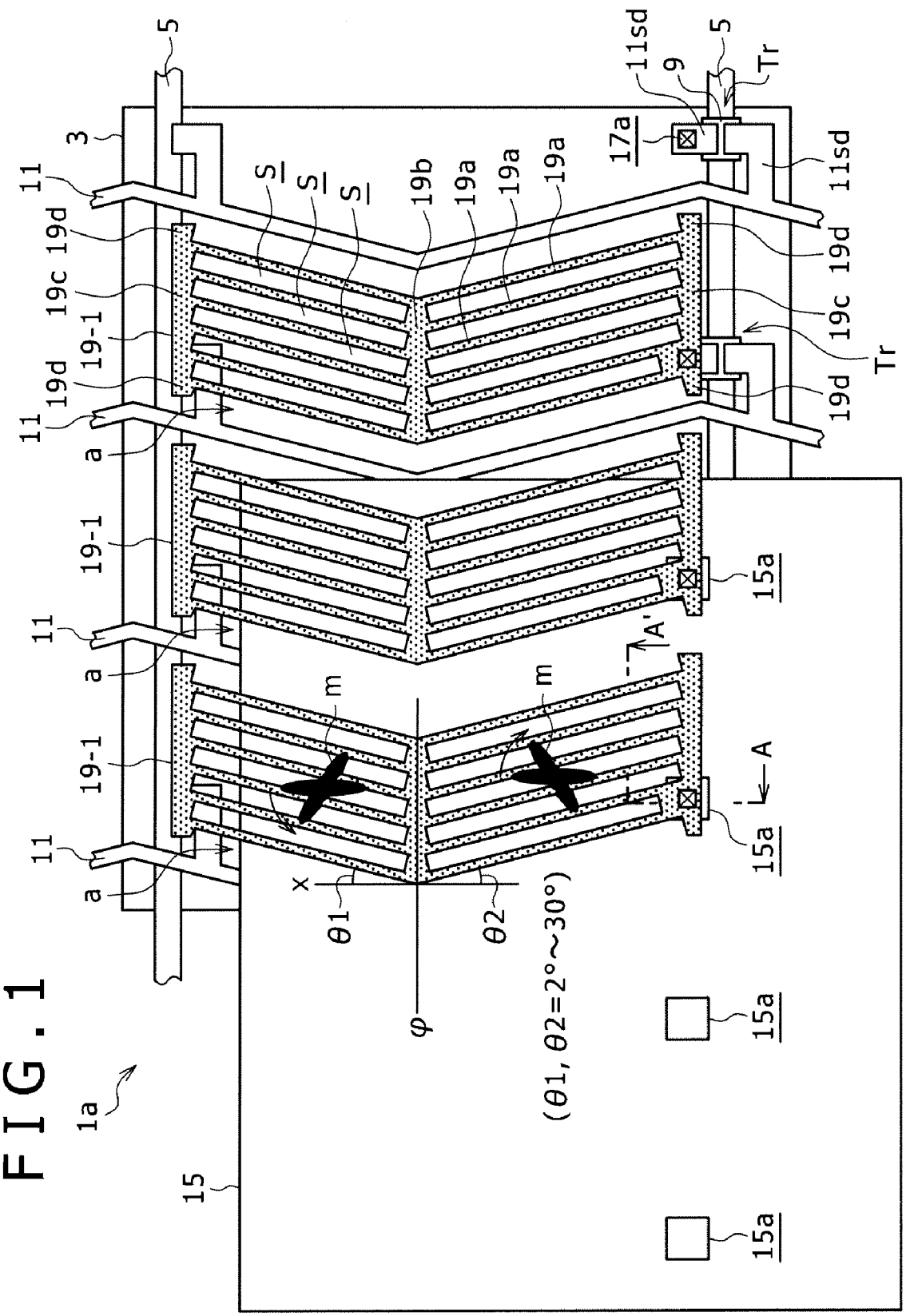
FIG. 1 is a plan schematic view describing the configuration of a display device according to a first embodiment.
Figure 2:
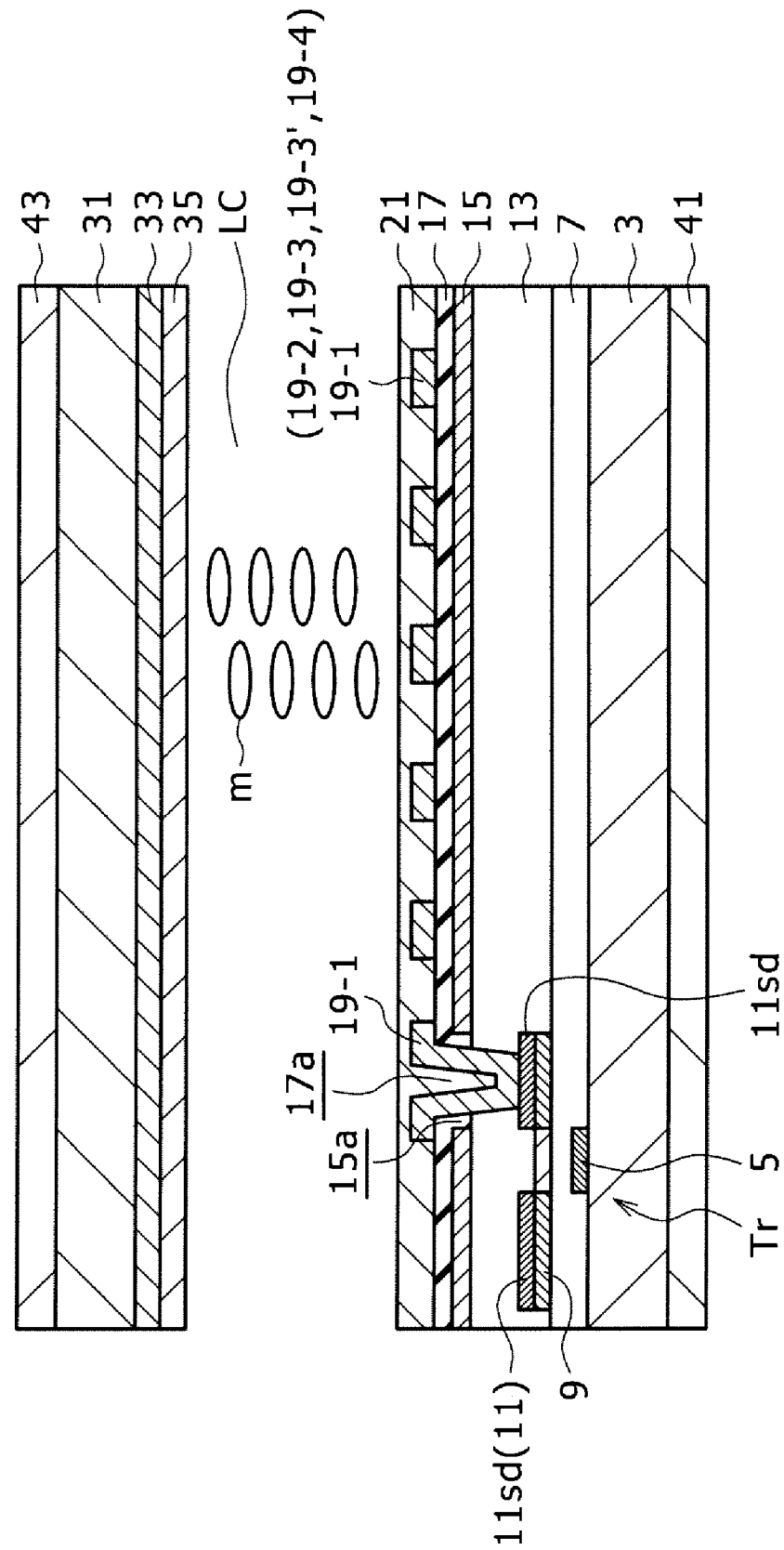
FIG. 2 is a sectional view describing the configuration of the display device according to the first embodiment.

FIG. 1 is a plan schematic view of three pixels on a drive substrate describing the configuration of a display device according to a first embodiment. FIG. 2 is a sectional view of the section A-A' in FIG. 1. It should be noted that insulating and orientation films, for example, are not illustrated in the plan schematic view.

A display device 1a shown in FIGS. 1 and 2 is a liquid crystal display device having an FFS multi-domain structure. A plurality of scan lines 5 are disposed in the horizontal direction on the first layer of a drive substrate 3 which is transmissive to visible light. Further, a gate insulating film 7 is provided over the substrate 3 to cover the scan lines 5.

A pattern of a semiconductor layer 9 is formed on the gate insulating film 7 to coincide with the scan lines 5. Further, a plurality of signal lines 11 are disposed in the vertical direction on the gate insulating film 7 to intersect the scan lines 5. The pixel a is provided at the intersection between one of the scan lines 5 and one of the signal lines 11. It should be noted that the pattern of the semiconductor layer 9 is formed for each of the pixels a.

Multi-layered source/drain electrodes 11sd are provided in each of the pixels a on the gate insulating film 7. The same electrodes 11sd are provided one on each side of the scan line 5 and on both ends of the semiconductor layer 9, thus forming a thin film transistor Tr having the scan line 5 as its gate electrode.

The source/drain electrodes 11sd are formed in the same layer as the signal lines 11. One of the source/drain electrodes 11sd extends from the signal line 11. It should be noted that the other of the source/drain electrodes 11sd is patterned in the form of an island.

Further, an interlayer insulating film 13 is formed on the gate insulating film 7 to cover the thin film transistor Tr. The interlayer insulating film 13 is thick enough to ensure positive insulation between the signal lines 11 and source/drain electrodes 11sd in the underlying layer and the overlying layers.

A common electrode 15, made, for example, of a transparent conductive material (e.g., ITO (indium tin oxide), IZO (indium zinc oxide)), is provided on the same film 13 in the form of a solid film shared by all the pixels a. As described above, the common electrode 15 is provided above the scan lines 5 and signal lines 11 with the thick interlayer insulating film 13 provided therebetween. This prevents the increase in load capacitance of the scan lines 5 and signal lines 11. Further, the common electrode 15 is in the form of a solid film. This likely provides improved aperture ratio of the pixels. It should be noted, however, that the common electrode 15 has opening portions 15a. Each of the same portions 15a exposes the top portion of one of the source/drain electrodes 11sd which is not connected to the signal line 11.

Then, pixel electrodes 19-1 having a configuration according to the embodiment is provided in the pixels a on the common electrode 15 with an insulating film 17 provided therebetween. The pixel electrodes 19-1 are made of a transparent conductive material (e.g., ITO, IZO). Further, the same electrodes 19-1 are connected inside the opening portions 15a of the common electrode 15 to the source/drain electrodes 11sd via connection holes 17a. The same holes 17a (shown only in the sectional view) are provided in the insulating film 17 and interlayer insulating film 13.

This permits selection of the thin film transistor Tr with an electric signal fed to the scan line 5. A video signal written from the signal line 11 via the selected thin film transistor Tr is supplied to the pixel electrode 19-1.

Each of the pixel electrodes 19-1 is in the form of comb teeth with a plurality of electrode sections 19a extending parallel to each other along the signal line 11. Further, the display device 1a has a multi-domain structure. Each of the electrode sections 19a is bent in different directions approximately in the middle along its extension direction in plan view. Each pixel a is divided into two domains. In these domains, the electrode sections 19a extend in different directions. It is preferred that the two groups of the electrode sections 19a extending in different directions in the two domains be mirror symmetric with respect to a symmetry axis $\phi$. The symmetry axis $\phi$ is an axis connecting the bent portions of the electrode sections 19a and running parallel to the scan lines 5. Further, angles $\theta 1$ and $\theta 2$ formed by the electrode sections 19a relative to a directional line x which is perpendicular to the scan lines 5 should preferably be approximately the same. For example, the angles $\theta 1$ and $\theta 2$, which are equal to each other, fall in the range from 0.5 to 45 degrees, and should preferably fall in the range from 2 to 30 degrees.

As a configuration according to the first embodiment, the pixel electrodes 19-1 each have a center connection portion 19b adapted to connect the electrode sections 19a at their bent portions. The center connection portion 19b, patterned to have a given width, is disposed parallel to the scan lines 5. The same portion 19b connects all the electrode sections 19a of each of the pixel electrodes 19-1.

Further, the pixel electrodes 19-1 each have end connection portions 19c. The same portions 19c are provided one at each end in the extension direction of the electrode sections 19a. The end connection portions 19c, patterned to have a given width, are disposed parallel to the scan lines 5. The same portions 19c connect all the electrode sections 19a of each of the pixel electrodes 19-1.

Still further, the pixel electrodes 19-1 each have protruding portions 19d each of which is formed by extending the end connection portion 19c in such a manner as to protrude from the arranged electrode sections 19a. The four protruding portions 19d are provided in such a manner as to protrude in two directions from both sides of each of the two end connection portion 19c, that is, in the directions parallel to the scan lines 5.

Figure 3:
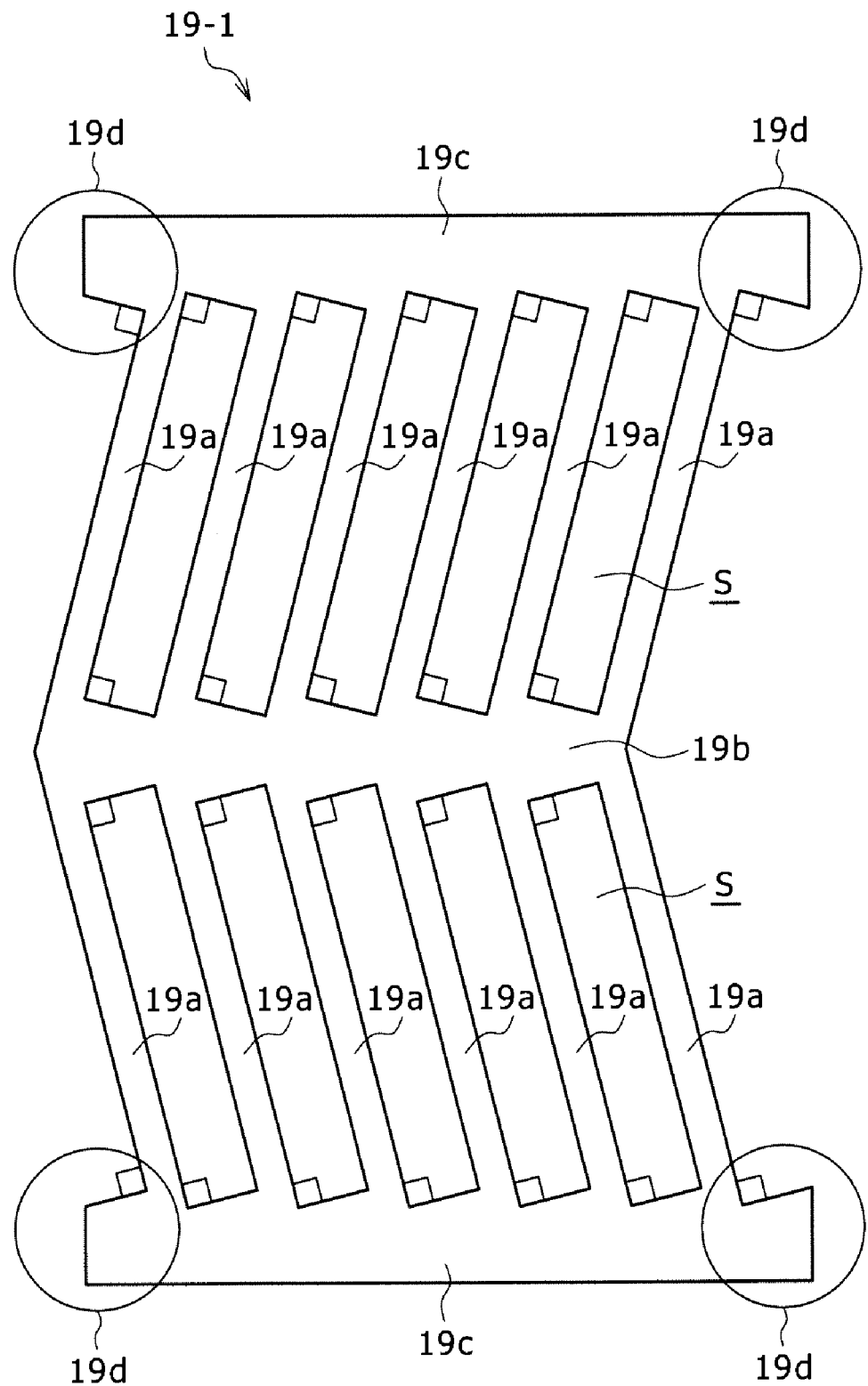
FIG. 3 is a plan view of a pixel electrode which is a characterizing part of the display device according to the first embodiment.

Here, FIG. 3 illustrates an enlarged plan view of the pixel electrode 19-1 shown in FIG. 1.

In such a configuration, it is preferred that the electrode sections 19a and center connection portion 19b be formed to be connected approximately perpendicular to each other in plan view. That is, it is preferred that the edge portions of the center connection portion 19b and electrode sections 19a be connected approximately perpendicular to each other.

Similarly, it is preferred that the electrode sections 19a and end connection portions 19c be formed to be connected approximately perpendicular to each other in plan view. That is, it is preferred that the edge portions of the end connection portions 19c and electrode sections 19a be connected approximately perpendicular to each other.

As a result, it is preferred that each of space portions S (unfilled areas) of the pixel electrodes 19-1 enclosed by the electrode sections 19a, center connection portion 19b and end connection portion 19c be approximately rectangular in plan view.

Further, it is preferred that the electrode sections 19a and protruding portions 19d be formed to be connected approximately perpendicular to each other in plan view. That is, it is preferred that the edge portions of the protruding portions 19d and electrode sections 19a be approximately perpendicular to each other. It should be noted, however, that the protruding portions 19d may be provided with a given width in the extension direction of the end connection portions 19c. In this case, the inner angle formed between the edge portion of the protruding portion 19d on the inner angle side in the bending direction of the electrode section 19a and that of the electrode section 19a is an obtuse angle. On the other hand, the inner angle formed between the edge portion of the protruding portion 19d on the outer angle side in the bending direction of the electrode section 19a and that of the electrode section 19a is an acute angle.

It should be noted that the signal lines 11 should preferably be bent to match the bend in the electrode sections 19a as illustrated in FIG. 1 to provide improved aperture ratio. However, if the aperture ratio is not essential, the signal lines 11 may be disposed linearly so that part thereof coincides with the pixel electrodes 19-1.

Then, an orientation film 21, shown only in the sectional view, is provided on the substrate 3 on which the above-described pixel electrodes 19-1 are provided, thus forming the top portion of the drive substrate 3.

On the other hand, an opposed substrate 31, shown only in the sectional view, is provided to face the side of the drive substrate 3 on which the pixel electrodes 19-1 are formed. The opposed substrate 31 is made of a light-transmitting material and has a color filter layer 33 formed on the side facing the pixel electrodes 19-1. The same layer 33 includes color filters of different colors patterned for each pixel. An orientation film 35 is provided to cover the color filter layer 33. Then, a liquid crystal layer LC is sandwiched together with a spacer (not shown) between the two orientation films 21 and 35.

Finally, polarizers 41 and 43 are provided one each on the outside of each of the substrates 3 and 31, thus forming the display device 1a.

The display device 1a formed as described above has an optical configuration as described below.

That is, the liquid crystal molecules m making up the liquid crystal layer LC have a positive or negative dielectric anisotropy. Here, we assume that the liquid crystal molecules m have, for example, a positive dielectric anisotropy. Further, the direction of the orientation process (e.g., rubbing direction) to which the orientation films 21 and 35 are subjected is approximately perpendicular to the scan lines 5 so that the liquid crystal molecules m are approximately perpendicular to the scan lines 5 when no electric field is applied to the common electrode 15 and pixel electrodes 19-1.

The two polarizers 41 and 43, provided on the outside of the substrates 3 and 31, are arranged in a crossed Nichol configuration so that the transmission axis of one of the polarizers matches the direction of the orientation process for the orientation films 21 and 35. Here, the transmission axis of the polarizer 43 on the opposed substrate 31 serving as the outgoing side (display side) is shown to match the direction of the orientation process for the orientation films 21 and 35.

It should be noted that, although not illustrated here, a photoreceiving sensor is provided for each pixel a if the display device 1a has a touch panel function. Alternatively, pressure-sensitive sensors may be provided across the display surface.

The display device 1a configured as described above operates in the same manner as common liquid crystal display devices having an FFS multi-domain structure.

That is, when no voltage is applied between the common electrode 15 and pixel electrodes 19-1, the axis of the liquid crystal molecules m making up the liquid crystal layer LC is oriented perpendicular to the transmission axis of the polarizer 41 on the incoming side and parallel to that of the polarizer 43 on the outgoing side. Therefore, light incident upon the polarizer 41 on the incoming side reaches the polarizer 43 on the outgoing side without any phase difference in the liquid crystal layer LC. The light is absorbed by the polarizer 43 on the outgoing side, thus displaying black (i.e., normally black display).

On the other hand, when a voltage is applied between the common electrode 15 and pixel electrodes 19-1, a lateral field is generated which is parallel to the substrate 3 and perpendicular to the extension direction of the electrode sections 19a of the pixel electrodes 19-1, causing the orientation direction of the liquid crystal molecules m to rotate in the plane parallel to the substrate 3. This changes the light incident upon the polarizer 41 on the incoming side into linearly polarized light which has rotated 90 degrees as a result of optical modulation in the liquid crystal layer LC. The linearly polarized light transmits through the polarizer 43 on the outgoing side, thus displaying white.

Further, when white is displayed, the multi-domain structure drives the liquid crystal molecules m in different rotational directions in the domains in which the groups of the electrode sections 19a extend in different directions within the single pixel a. This provides improved view angle characteristic (color shift) for display of shades of gray and white.

In the display device 1a according to the first embodiment in particular, the pixel electrodes 19-1 each have not only the center connection portion 19b adapted to connect the electrode sections 19a at their bent portions but also the protruding portions 19d extended outwardly from the end connection portions 19c. This ensures a stable shape of the electric field at the bent portions of the electrode sections 19a, thus contributing to significantly stable orientation of the liquid crystal molecules m at the bent portions during white display (normally black display).

Therefore, even if reverse twisting occurs as a result of an external pressure (e.g., finger press) being exerted on the display surface of the display device 1a during white display, the liquid crystal molecules m of the liquid crystal layer LC can be readily restored to their more stable original orientation with the display device left standing. This makes it possible to completely eliminate display unevenness caused by reverse twisting by leaving the display device standing.

Figure 19:
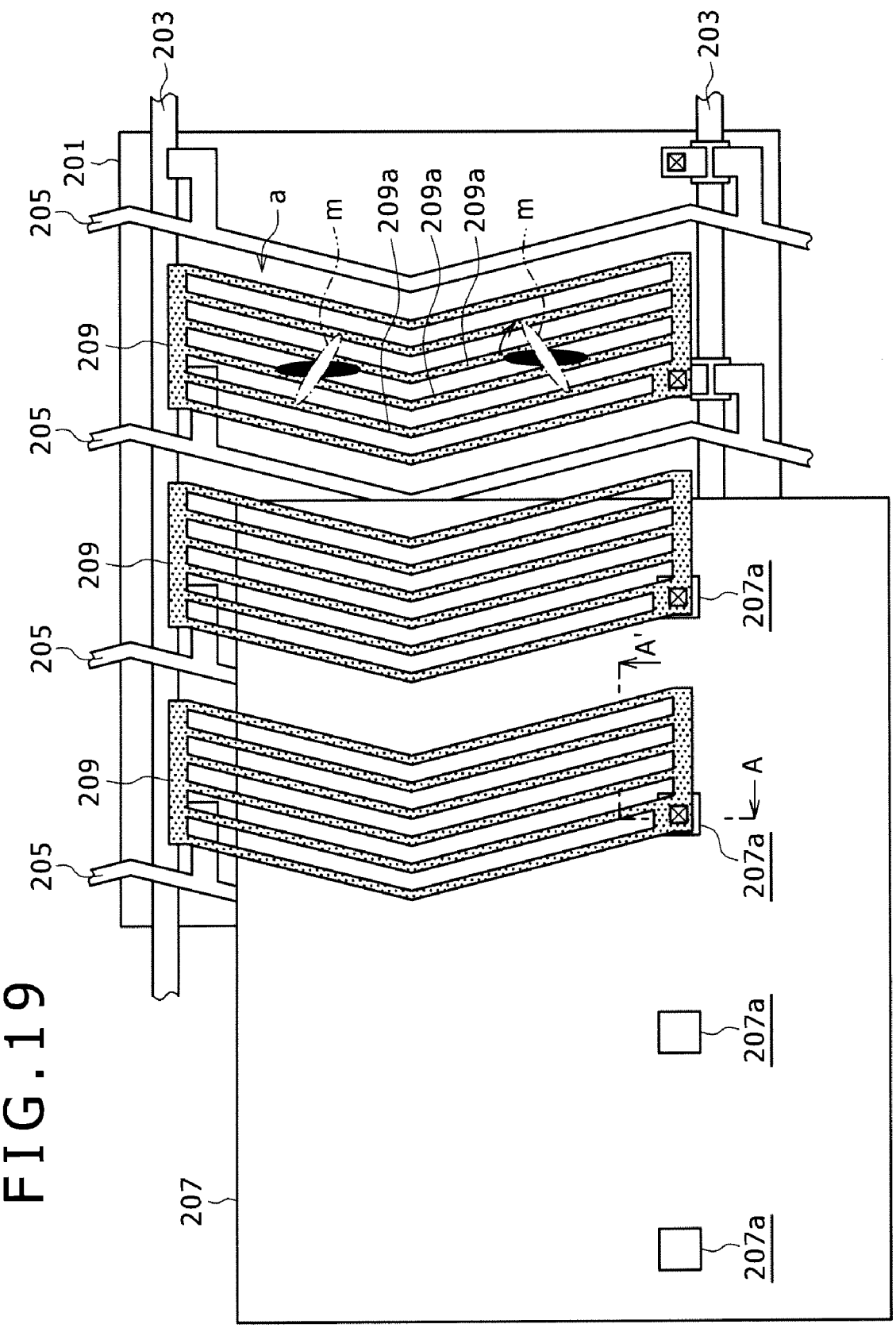
FIG. 19 is a plan view of major components illustrating an example of an FFS mode liquid crystal display device in related art.

Table 1 given below shows the evaluation results of the finger press unevenness for the configuration according to the first embodiment. This table also shows the evaluation results for two other configurations, one in which the protruding portions 19d are not provided in the first embodiment in FIG. 1 as a comparative example and another described with reference to FIG. 19 as a conventional example.

TABLE 1

| Structure | Evaluation of finger press unevenness | |
|---|---|---|
| | Observation from front | Observation from diagonal direction |
| 1st embodiment (FIG. 3) | Completely vanished in 3 sec or so | Completely vanished in 3 sec or so |
| Comparative example (structure without protruding portions 19d in FIG. 3) | Almost completely vanished in 3 sec or so | Wouldn't vanish when left standing |
| Conventional example (FIG. 19) | Wouldn't vanish when left standing | Wouldn't vanish when left standing |

Here, time f was measured by observation from the front and a diagonal direction. The time f is a period of time from when the finger pressure is removed after the surface of the display device 1a has been finger-pressed to when the finger press unevenness is eliminated with the display device left standing. It should be noted that the configuration according to the first embodiment differs from the comparative example in that the former has the center connection portion 19b and protruding portions 19d for the pixel electrodes 19-1 and the latter has the center connection portion 19b but not the protruding portions 19d. The configuration according to the first embodiment differs from the conventional example in that the latter has neither the center connection portion nor the protruding portions as described with reference to FIG. 19.

As shown in Table 1, it was confirmed by the observation from the front and a diagonal direction that the display device according to the first embodiment having the center connection portion 19b and protruding portions 19d for the pixel electrodes 19-1 completely eliminated the finger press unevenness in three seconds of so when left standing. In contrast, the observation from a diagonal direction revealed that the configuration according to the comparative example having the center connection portion 19b but not the protruding portions 19d for the pixel electrodes 19-1 failed to eliminate the finger press unevenness when left standing although the observation from the front showed that the same configuration nearly completely eliminated the unevenness in roughly three seconds when left standing. Further, it was found by the observation from the front and a diagonal direction that the configuration according to the conventional example having neither the center connection portion 19b nor the protruding portions 19d for the pixel electrodes 19-1 failed to eliminate the finger press unevenness when left standing.

As described above, the display device 1a according to the first embodiment having a lateral field multi-domain structure can completely eliminate display unevenness caused by reverse twisting when left standing, thus providing enhanced display characteristics. If applied particularly to a display device having a touch panel function which is subjected to external pressure (e.g., finger press) on the display surface, the embodiment keeps the impact of such external pressure to a minimum in the display.

2. Second Embodiment

Figure 4:
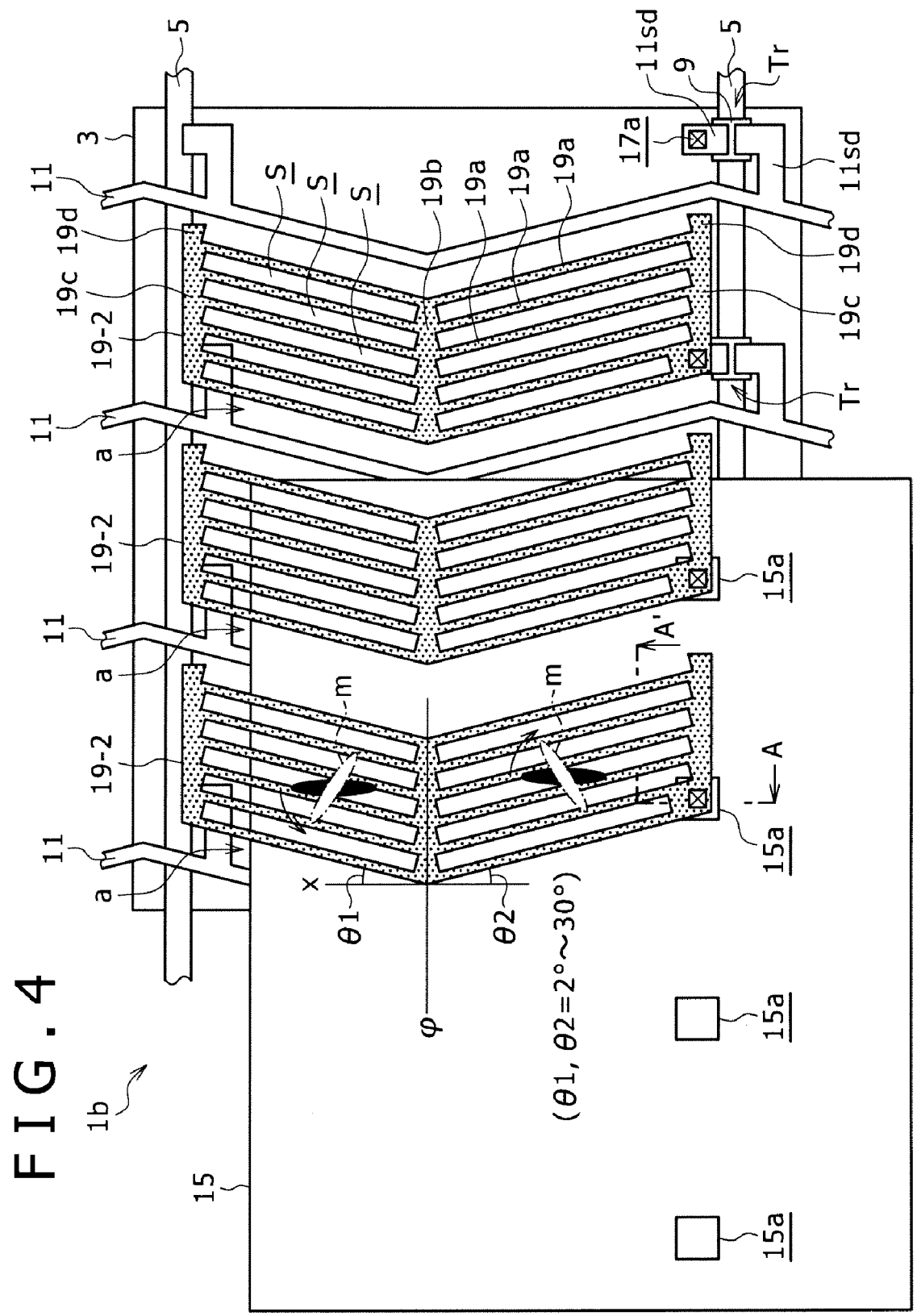
FIG. 4 is a plan schematic view describing the configuration of a display device according to a second embodiment.
Figure 5:
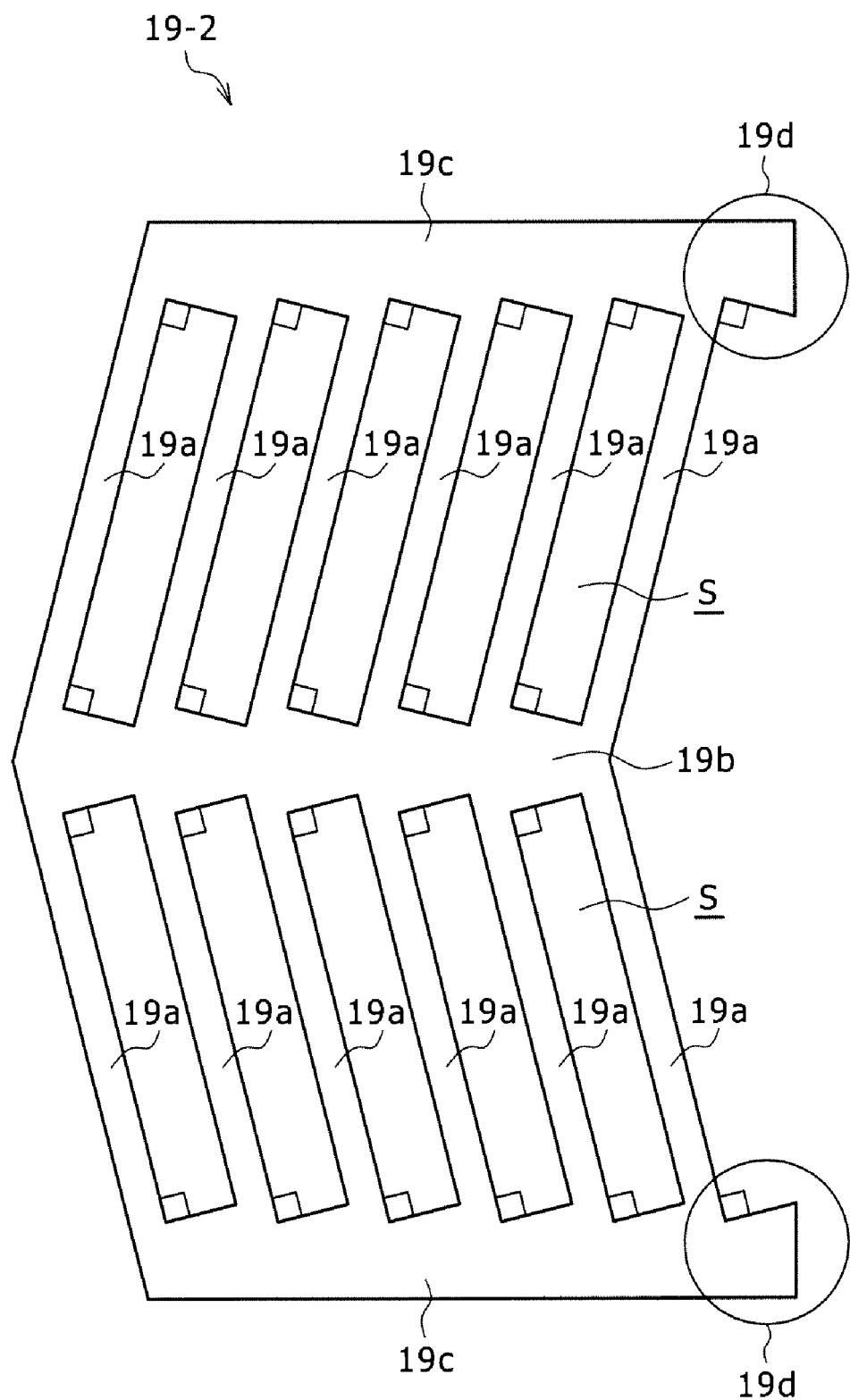
FIG. 5 is a plan view of the pixel electrode which is a characterizing part of the display device according to the second embodiment.

FIG. 4 is a plan schematic view of three pixels on the drive substrate describing the configuration of a display device according to a second embodiment. FIG. 5 is an enlarged view of the pixel electrode shown in FIG. 4.

A display device 1b according to the second embodiment differs from the display device 1a according to the first embodiment in the shape of pixel electrodes 19-2 in plan view and is similar thereto in all other respects.

That is, in the pixel electrodes 19-2 according to the second embodiment, the protruding portions 19d are extended only on the inner angle side in the bending direction of the electrode sections 19a. In other words, the protruding portions 19d are each extended parallel to the scan lines 5 only from one of the two ends of each of the end connection portions 19c, namely, the one on the inner angle side in the bending direction of the electrode section 19a.

The display device 1b configured as described above is a liquid crystal display device having an FFS multi-domain structure as with the display device according to the first embodiment and operates in the same manner as this display device.

For the display device 1b, as described in relation to the first embodiment, the time f was also measured by observation from the front and a diagonal direction. The time f is a period of time from when the finger pressure is removed after the surface of the display device 1b has been finger-pressed to when the finger press unevenness is eliminated with the display device left standing. As a result, it was confirmed by the observation from the front and a diagonal direction that the finger press unevenness was completely eliminated in three seconds or so by leaving the display device standing, as with the display device 1a according to the first embodiment.

Thus, the configuration of the display device 1b according to the second embodiment can also completely eliminate reverse twisting, resulting from external pressure (e.g., finger press) exerted on the display surface, by leaving the display device standing.

In the pixel electrodes 19-2 of the display device 1b according to the second embodiment, the protruding portions 19d, formed by extending the end connection portions 19c in such a manner as to protrude from the arranged electrode sections 19a, are provided only in one direction of the end connection portions 19c. As a result, the pixel electrodes 19-2 are smaller in outer shape than their counterparts according to the first embodiment. This provides a larger space between the pixel electrodes of the adjacent pixels, thus ensuring reduced risks of defects such as short circuit.

3. Third Embodiment

Figure 6:
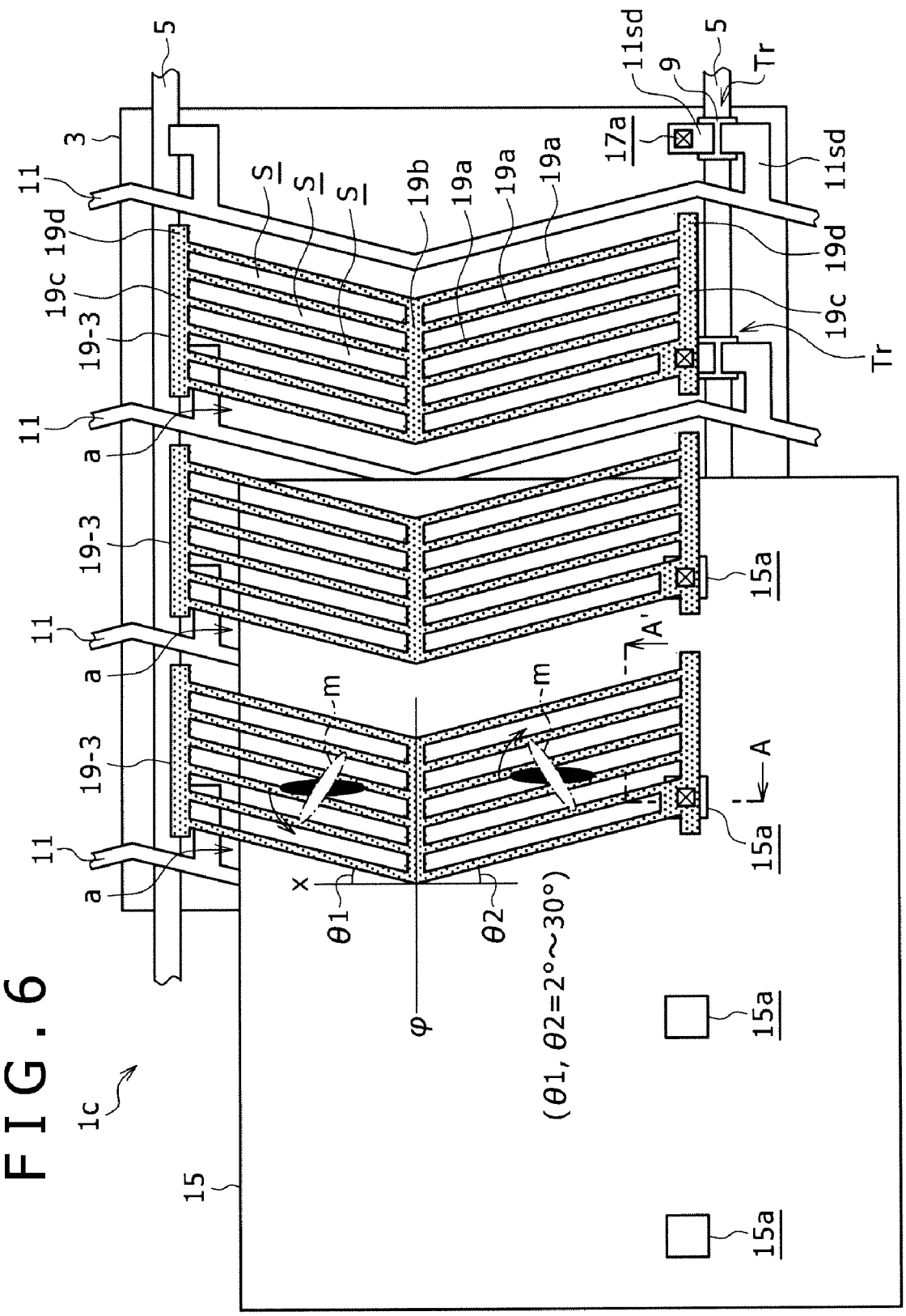
FIG. 6 is a plan schematic view describing the configuration of a display device according to a third embodiment.
Figure 7:
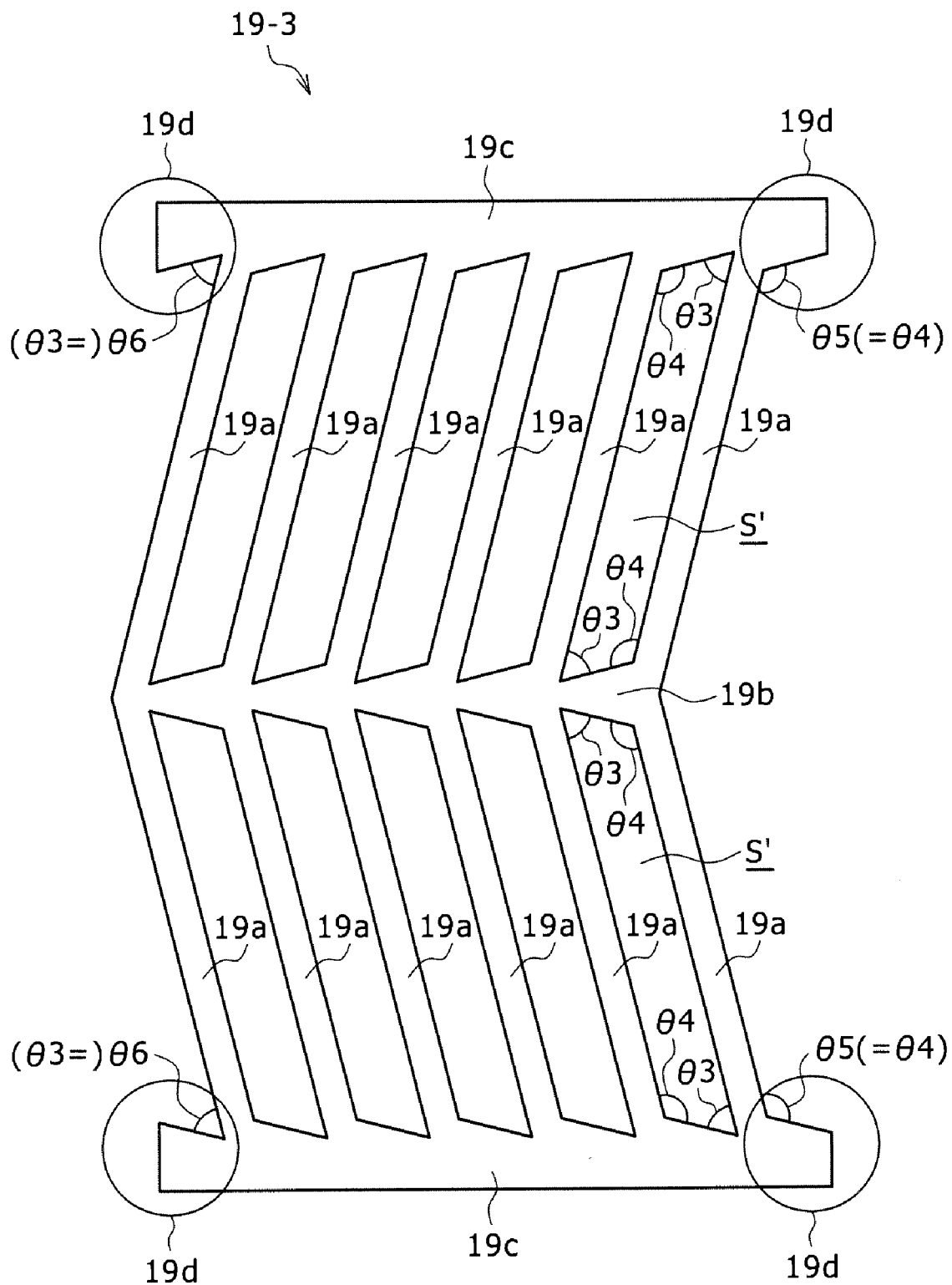
FIG. 7 is a plan view of the pixel electrode which is a characterizing part of the display device according to the third embodiment.

FIG. 6 is a plan schematic view of three pixels on the drive substrate describing the configuration of a display device according to a third embodiment. FIG. 7 is an enlarged view of the pixel electrode shown in FIG. 6.

A display device 1c according to the third embodiment shown in FIGS. 6 and 7 differs from the display device 1a according to the first embodiment in the shape of pixel electrodes 19-3 in plan view and is similar to the display device according to the second embodiment in all other respects.

That is, the pixel electrodes 19-3 according to the third embodiment each include the plurality of electrode sections 19a, center connection portion 19b and end connection portions 19c. The electrode sections 19a are bent approximately in the middle along their extension direction. The center connection portion 19b connects together the electrode sections 19a at their bent portions. The end connection portions 19c connect together the electrode sections 19a at the ends in their extension direction. The third embodiment is similar to the first embodiment in that the four protruding portions 19d, formed by extending the end connection portions 19c in such a manner as to protrude from the arranged electrode sections 19a, are provided in two directions. It should be noted that the protruding portions 19d may be provided only on the inner angle side in the bending direction of the electrode sections 19a, as with the second embodiment.

In the configuration described above, space portions S' (unfilled areas) each enclosed by the electrode sections 19a, center connection portion 19b and end connection portion 19c are parallelogramic. In these parallelograms, an inner angle θ3, which is closest to the protruding portions 19d on the inner angle side in the bending direction of the electrode sections 19a making up the pixel electrodes 19-3, i.e., the inner angle θ3 on the inner angle side in the bending direction of the electrode sections and formed by the electrode section and end connection portion 19c, is an acute angle. The inner angle θ3 need only be an acute angle, for example, in the range from 85 to 40 degrees.

As a result, the opposed angle of the parallelograms is also the inner angle θ3. On the other hand, an inner angle θ4 adjacent to the inner angle θ3 in the space portions S' (unfilled areas) is an obtuse angle.

Further, an angle θ5 formed between the protruding portion 19d on the inner angle side in the bending direction of the electrode section 19a and the electrode section 19a may be the same as the inner angle θ4. On the other hand, an angle θ6 formed between the protruding portion 19d on the outer angle side in the bending direction of the electrode section 19a and the electrode section 19a may be the same as the inner angle θ3.

It should be noted that this protruding portion 19d may be provided with a given width in such a manner as to protrude in the extension direction of the end connection portion 19c. Even in this case, the inner angle θ5 formed between the edge portion of the protruding portion 19d on the inner angle side in the bending direction of the electrode section 19a and that of the electrode section 19a is an obtuse angle. On the other hand, the inner angle θ6 formed between the edge portion of the protruding portion 19d on the outer angle side in the bending direction of the electrode section 19a and that of the electrode section 19a is an acute angle.

Figure 8:
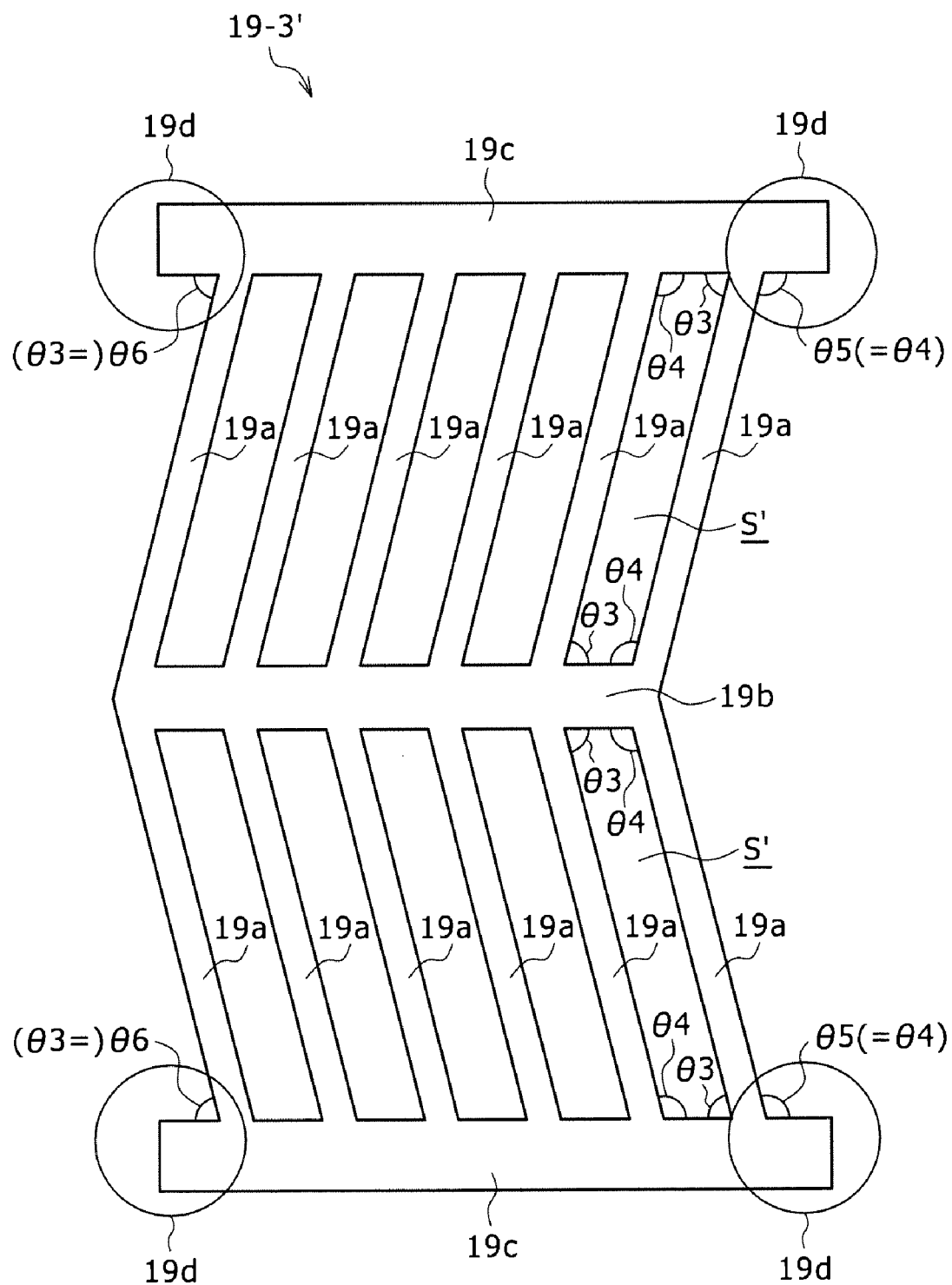
FIG. 8 is a plan view illustrating an example of the pixel electrode which is a characterizing part of the display device according to the third embodiment.

One among examples of the pixel electrode 19-3 according to the third embodiment is a pixel electrode 19-3' illustrated in FIG. 8. That is, in the pixel electrode 19-3' illustrated in FIG. 8, the electrode sections 19a, center connection portion 19b, end connection portions 19c and protruding portions 19d are each formed with a given width.

As a result, the space portions S (unfilled areas) of the pixel electrodes 19-3' each enclosed by the electrode sections 19a, center connection portion 19b and end connection portion 19c are parallelogramic in plan view. Further, the inner angle θ3 of these parallelograms, which is closest to the protruding portions 19d extended on the inner angle side in the bending direction of the electrode sections 19a making up the pixel electrodes 19-3', i.e., the inner angle θ3 on the inner angle side in the bending direction of the electrode sections and formed by the electrode section and end connection portion 19c, is an acute angle.

As a result, the opposed angle of the parallelograms is also the inner angle θ3. On the other hand, the inner angle θ4 adjacent to the inner angle θ3 in the space portions S' (unfilled areas) is an obtuse angle.

Further, the angle θ5 formed between the protruding portion 19d on the inner angle side in the bending direction of the electrode section 19a and the electrode section 19a may be the same as the inner angle θ4. On the other hand, the angle θ6 formed between the protruding portion 19d on the outer angle side in the bending direction of the electrode section 19a and the electrode section 19a may be the same as the inner angle θ3.

Even in the display device 1c having the pixel electrodes 19-3 or 19-3' as described above, the same electrodes 19-3 or 19-3' each have not only the center connection portion 19b adapted to connect the electrode sections 19a at their bent portions but also the protruding portions 19d extended outwardly from the end connection portions 19c. This ensures a stable shape of the electric field at the bent portions of the electrode sections 19a, thus contributing to acceptably stable orientation of the liquid crystal molecules m at the bent portions during white display (normally black display).

Therefore, even if reverse twisting occurs as a result of an external pressure (e.g., finger press) being exerted on the display surface of the display device 1c during white display, the liquid crystal molecules m of the liquid crystal layer LC can be readily restored to their more stable original orientation with the display device left standing. This makes it possible to completely eliminate display unevenness caused by reverse twisting by leaving the display device standing.

Figure 9:
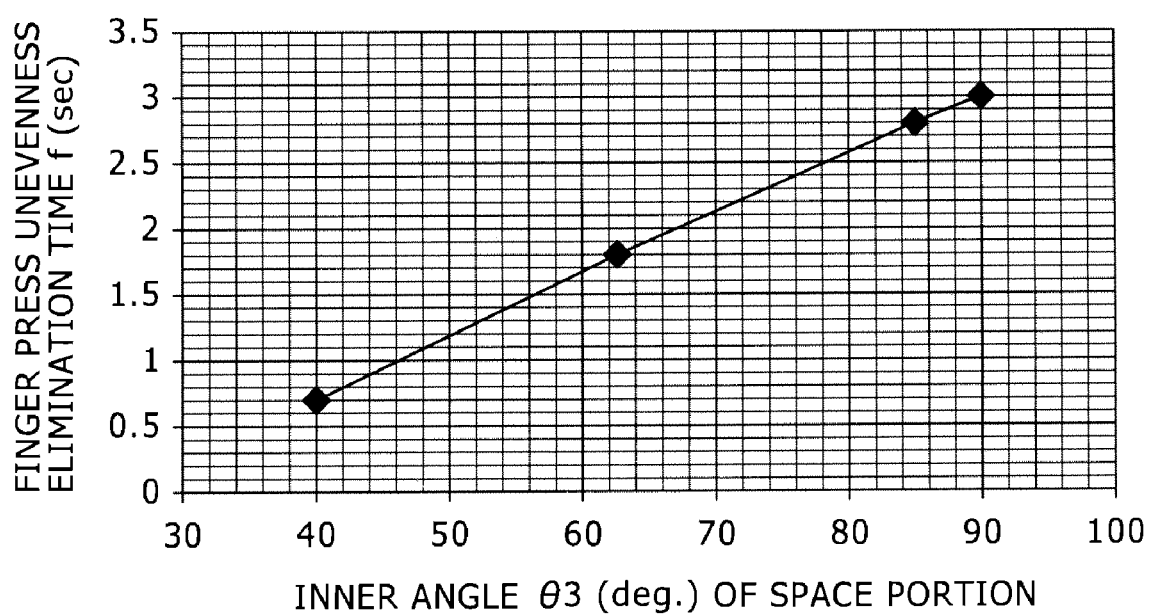
FIG. 9 is a graph of finger press unevenness elimination time for a predetermined inner angle in the display device according to the third embodiment.

For the display device 1c with the inner angle θ3 of 40.0, 62.5 and 85.0 degrees, the finger press unevenness was evaluated as described in relation to the first embodiment. Here, the time f was measured by observation from the front and a diagonal direction. The time f is a period of time from when the finger pressure is removed after the surface of the display device 1b has been finger-pressed to when the finger press unevenness is eliminated with the display device left standing. Table 2 given below shows the evaluation results of the finger press unevenness for the configuration according to the third embodiment. This table also shows the evaluation results of Table 1 for comparison. Further, FIG. 9 illustrates a graph of the finger press elimination time f for the inner angle θ3.

TABLE 2

| Structure | | Evaluation of finger press unevenness | |
|---|---|---|---|
| | | Observation from front | Observation from diagonal direction |
| 3rd embodiment | θ3 = 40.0 deg. (FIG. 7) | Completely vanished in less than 1 sec | Completely vanished in less than 1 sec |
| | θ3 = 62.5 deg. (FIG. 7) | Completely vanished in 2 sec or so | Completely vanished in 2 sec or so |
| | θ3 = 85.0 deg. (FIG. 8) | Completely vanished in 3 sec or so | Completely vanished in 3 sec or so |
| 1st embodiment | (θ3 = 90.0 deg.) (FIG. 3) | Completely vanished in 3 sec or so | Completely vanished in 3 sec or so |
| Comparative example (structure without protruding portions 19d in FIG. 3) | | Almost completely vanished in 3 sec or so | Wouldn't vanish when left standing |
| Conventional example (FIG. 19) | | Wouldn't vanish when left standing | Wouldn't vanish when left standing |

From Table 2, it was confirmed by the observation from the front and a diagonal direction that the display device 1c according to the third embodiment having the acute inner angle θ3 offers a shorter finger press unevenness elimination time than the display device 1a according to the first embodiment having a right inner angle.

Thus, the configuration of the display device 1c according to the third embodiment can quickly and completely eliminate reverse twisting, resulting from external pressure (e.g., finger press) exerted on the display surface, by leaving the display device standing.

It should be noted that the display device according to the third embodiment may be combined with that according to the second embodiment. In this case, the protruding portions 19d, formed by extending the end connection portions 19c in such a manner as to protrude from the arranged electrode sections 19a, are provided only in one direction of the end connection portions 19c. As a result, the pixel electrodes 19-3 or 19-3' are smaller in outer shape. This provides a larger space between the pixel electrodes of the adjacent pixels, thus ensuring reduced risks of defects such as short circuit.

4. Fourth Embodiment

Figure 10:
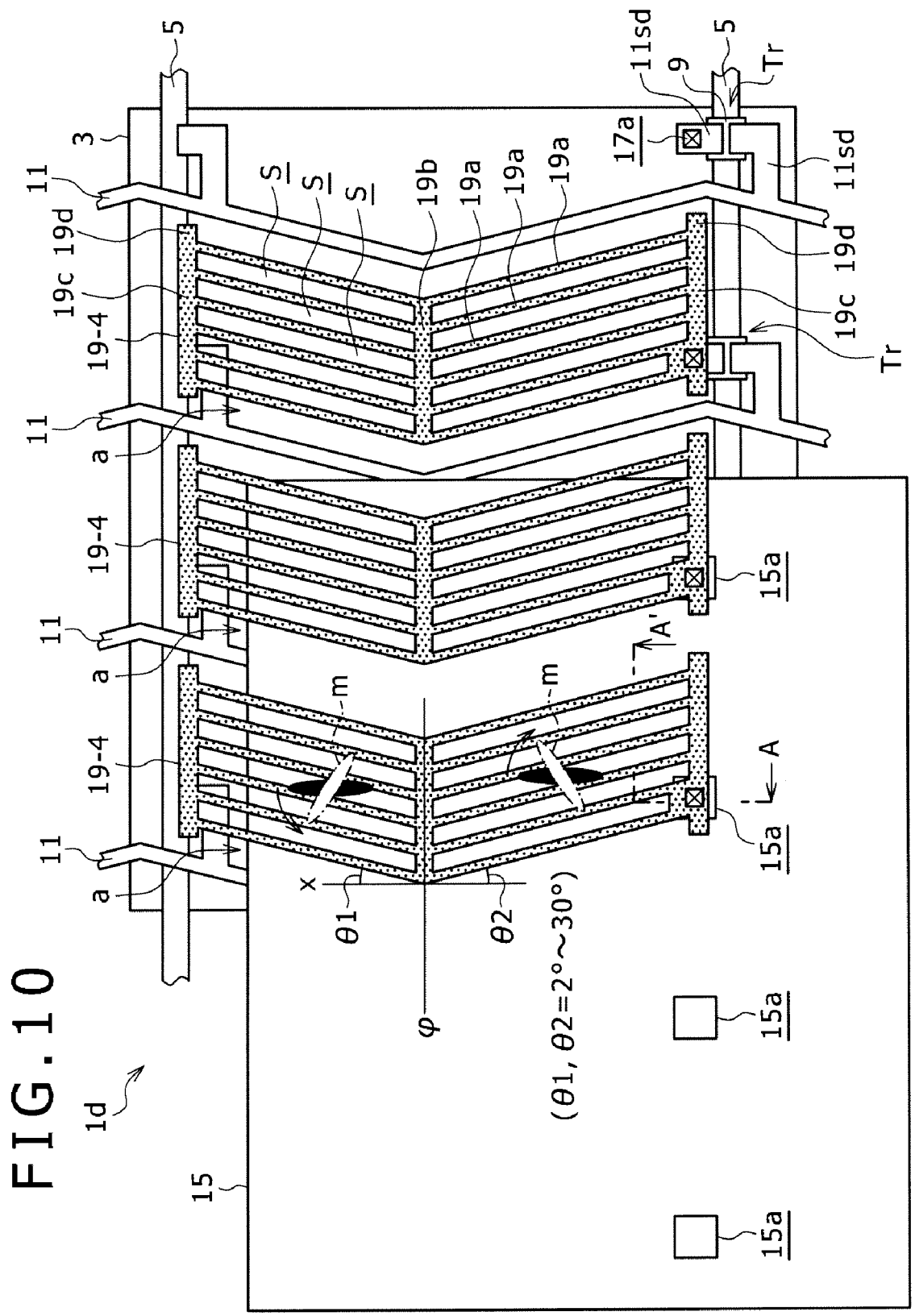
FIG. 10 is a plan schematic view describing the configuration of a display device according to a fourth embodiment.
Figure 11:
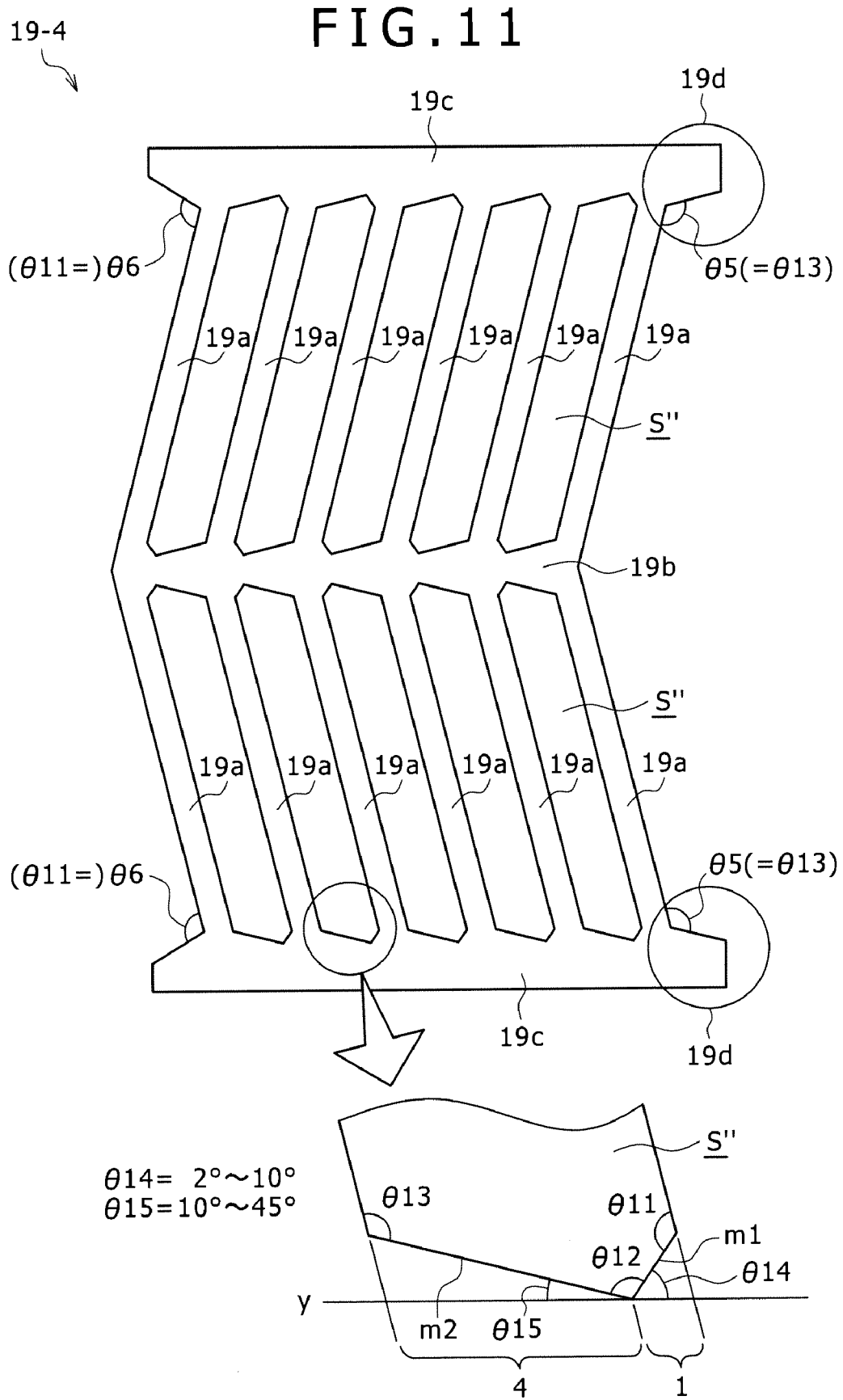
FIG. 11 is a plan view of the pixel electrode which is a characterizing part of the display device according to the fourth embodiment.

FIG. 10 is a plan schematic view of three pixels on the drive substrate describing the configuration of a display device according to a fourth embodiment. FIG. 11 is an enlarged view of the pixel electrode shown in FIG. 10.

A display device 1d according to the fourth embodiment shown in FIGS. 10 and 11 differs from the display device 1a according to the first embodiment in the shape of pixel electrodes 19-4 in plan view and is similar to the display device according to the first embodiment in all other respects.

That is, the pixel electrodes 19-4 according to the fourth embodiment each include the plurality of electrode sections 19a, center connection portion 19b and end connection portions 19c. The electrode sections 19a are bent approximately in the middle along their extension direction. The center connection portion 19b connects together the electrode sections 19a at their bent portions. The end connection portions 19c connect together the electrode sections 19a at the ends in their extension direction. The fourth embodiment is similar to the first embodiment in that the four protruding portions 19d, formed by extending the end connection portions 19c in such a manner as to protrude from the arranged electrode sections 19a, are provided in two directions. It should be noted that the protruding portions 19d may be provided only on the inner angle side in the bending direction of the electrode sections 19a, as with the second embodiment.

In the above configuration, space portions S" (unfilled areas) each enclosed by the electrode sections 19a, center connection portion 19b and end connection portion 19c have a shape in plan view all of whose inner angles are obtuse angles.

Here, as an example, each of the space portions S" is shown to be a hexagon having three pairs of parallel straight lines, i.e., two parallel sides made up of the two adjacent electrode sections 19a, two adjacent sides made up of the edge portions of the center connection portion 19b and two adjacent sides made up of the edge portions of the end connection portion 19c. The space portions S" have three pairs of inner angles θ11, θ12 and θ13. The angles of each pair are opposed and equal to each other.

In these hexagonal space portions S", it is preferred that the two adjacent sides made up of the edge portions of the end connection portion 19c, i.e., sides m1 and m2 respectively on the inner and outer angle sides in the bending direction of the electrode section 19a be in the ratio of about 1 to 4. Further, it is preferred that an angle θ14 formed between a direction y in which the end connection portion 19c is extended and the side m1 be in the range from 2 to 10 degrees and that an angle θ15 formed between the direction y in which the end connection portion 19c is extended and the side m2 be in the range from 10 to 45 degrees.

Further, in the hexagonal space portions S" each having three pairs of parallel straight lines, the two adjacent sides made up of the edge portions of the center connection portion 19b are associated with the two adjacent sides made up of the edge portions of the end connection portion 19c.

Still further, the angle θ5 formed between the protruding portion 19d on the inner angle side in the bending direction of the electrode section 19a and the electrode section 19a may be the same as the inner angle θ13 formed between the side m2 and electrode section 19a. On the other hand, the angle θ6 formed between the protruding portion 19d on the outer angle side in the bending direction of the electrode section 19a and the electrode section 19a may be the same as the inner angle θ11 formed between the side m1 and electrode section 19a.

It should be noted that this protruding portion 19d may be provided with a given width in such a manner as to protrude in the extension direction of the end connection portion 19c. Even in this case, the inner angle θ5 formed between the edge portion of the protruding portion 19d on the inner angle side in the bending direction of the electrode section 19a and that of the electrode section 19a is an obtuse angle. On the other hand, the inner angle θ6 formed between the edge portion of the protruding portion 19d on the outer angle side in the bending direction of the electrode section 19a and that of the electrode section 19a is an acute angle.

Even in the display device 1d having the pixel electrodes 19-4 as described above, the same electrodes 19-4 each have not only the center connection portion 19b adapted to connect the electrode sections 19a at their bent portions but also the protruding portions 19d extended outwardly from the end connection portions 19c. This ensures a stable shape of the electric field at the bent portions of the electrode sections 19a, thus contributing to acceptably stable orientation of the liquid crystal molecules m at the bent portions during white display (normally black display).

Further, the inner angles of the space portions S" in the pixel electrodes 19-4 are all obtuse angles. Therefore, it is unlikely that there will be locations where the orientation of the electric field changes abruptly between the pixel electrodes 19-4 and common electrode 15, i.e., the orientation of the liquid crystal molecules m changes abruptly. This ensures a further stable orientation of the liquid molecules.

Therefore, even if reverse twisting occurs as a result of an external pressure (e.g., finger press) being exerted on the display surface of the display device, the liquid crystal molecules m of the liquid crystal layer LC can be readily restored to their more stable original orientation with the display device left standing. This makes it possible to completely eliminate display unevenness caused by reverse twisting by leaving the display device standing.

5. Fifth Embodiment

Figure 12:
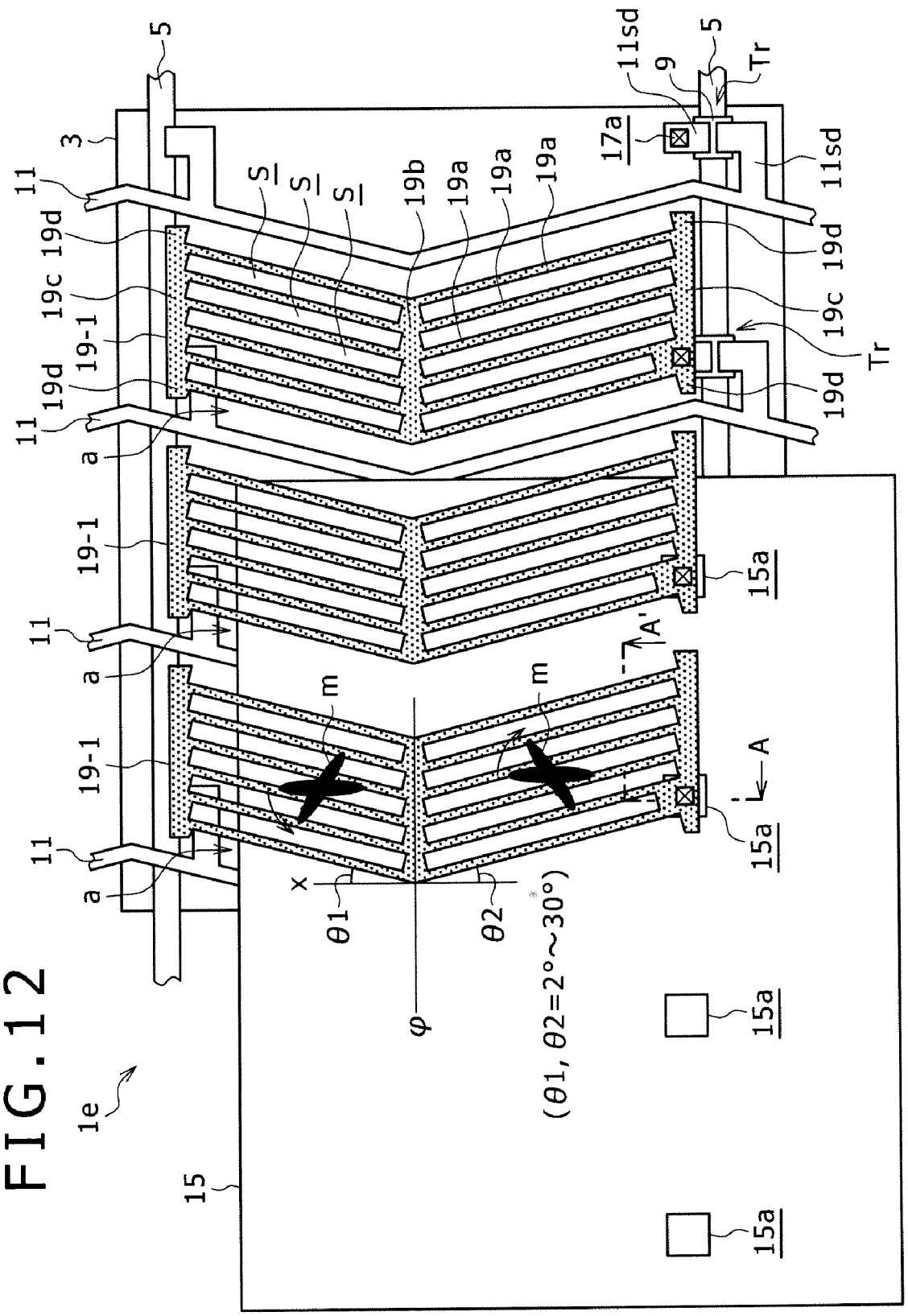
FIG. 12 is a plan schematic view describing the configuration of a display device according to a fifth embodiment.

FIG. 12 is a plan schematic view of three pixels on the drive substrate describing the configuration of a display device according to a fifth embodiment.

A display device 1e according to the fifth embodiment shown in FIG. 12 differs from the display device 1a according to the first embodiment in that a light-shielding pattern 5a is provided to coincide with the center connection portion 19b of the pixel electrodes 19-1. The same device 1e is similar to the display device according to the first embodiment in all other respects.

That is, the light-shielding pattern 5a is formed in the same process step as, for example, for the scan lines 5 and disposed parallel thereto. On the other hand, the light-shielding pattern 5a is not limited to be provided on the drive substrate 3 but may be provided on the opposed substrate as a black matrix.

In the display device 1e according to the fifth embodiment, the light-shielding pattern provided to coincide with the center connection portion 19b prevents reduced contrast. That is, the electric field is not perpendicular to the extension direction of the electrode sections 19a near the center connection portion 19b. This prevents the liquid crystal molecules m from being driven properly, thus resulting in reduced display contrast. Therefore, when the light-shielding pattern is provided to coincide with the center connection portion 19b, the areas where the light-shielding pattern is provided are light-transmitting, thus preventing reduced display contrast.

The fifth embodiment described above may be combined with any of the second to fourth embodiments. Also in this case, the same advantageous effects can be achieved.

In the above description of the first to fifth embodiments, the common electrode 15 was disposed in a layer above the scan lines 5 and signal lines 11. However, the embodiment is also applicable to a display device having an FFS multi-domain structure in which the common electrode 15 is disposed in the same layer as the scan lines 5 and signal lines 11. Also in this case, the same advantageous effects can be achieved.

Figure 13:
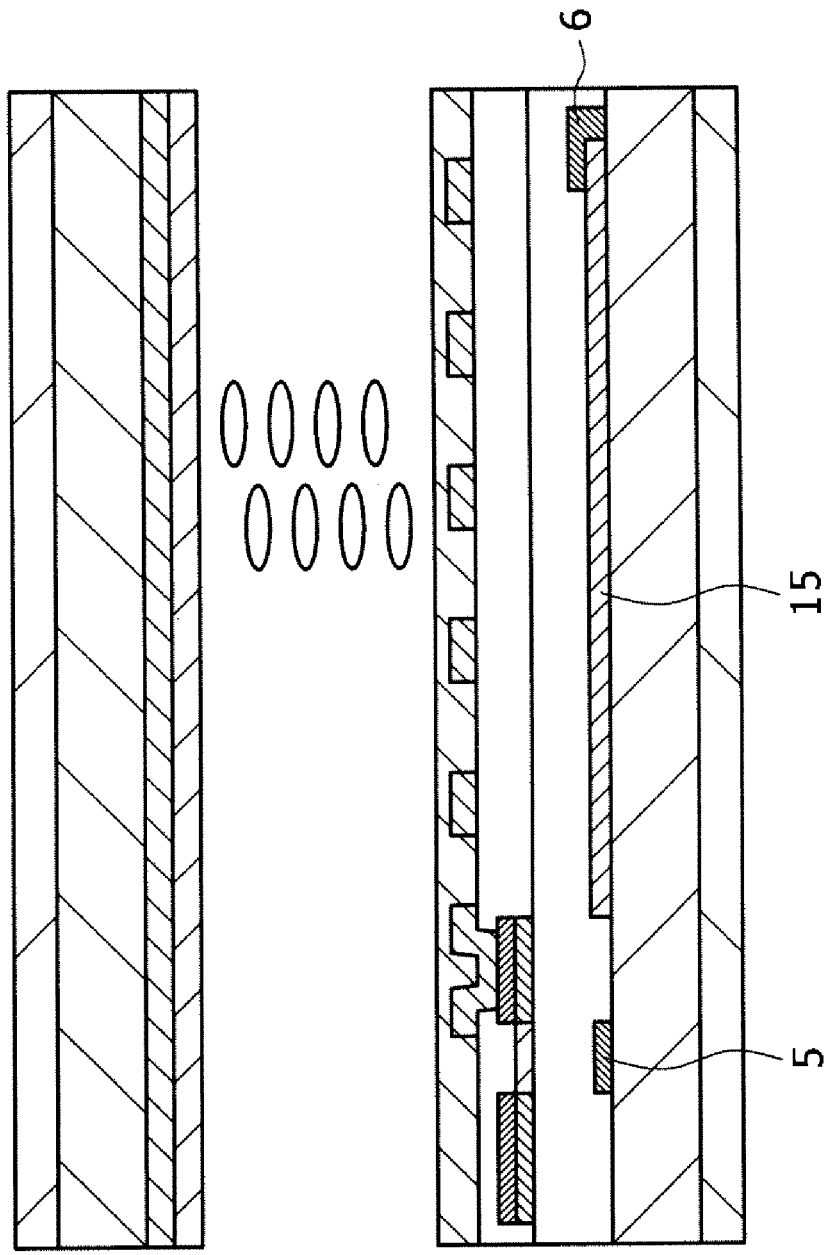
FIG. 13 is a sectional view of a display device according to still another embodiment to which the present application is applied.

For example, as illustrated in FIG. 13, the common electrode 15 may be provided in the same layer as the scan lines 5. In this case, the common electrode 15 made of a transparent conductive material is patterned to cover as large an area of the pixel a as possible. In this case, a common wiring 6 adapted to connect together the common electrodes 15 between the different pixels a may be formed with a more conductive material in the same process step. The same wiring 6 is disposed parallel to the scan lines 5.

Application Examples

The aforementioned display device according to the embodiments is applicable as a display device of a wide range of electronic equipment including a digital camera, laptop personal computer, personal digital assistant such as mobile phone and video camcorder illustrated in FIGS. 14 to 18. These pieces of equipment are designed to display an image or video of a video signal fed to or generated inside the electronic equipment. Examples of electronic equipment to which an embodiment is applied will be described below.

Figure 14:
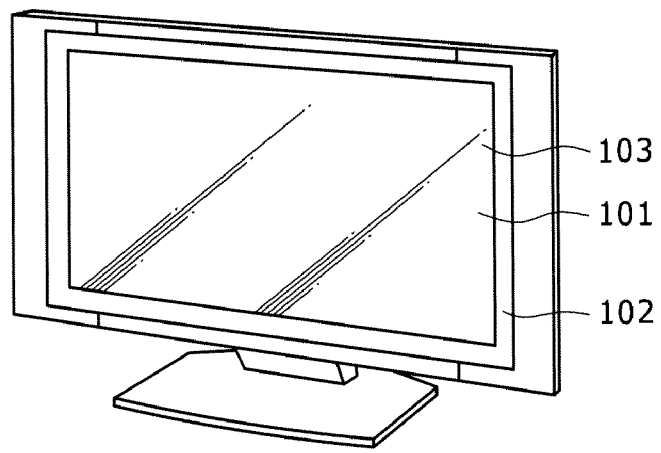
FIG. 14 is a perspective view illustrating a television set to which an embodiment is applied.

FIG. 14 is a perspective view illustrating a television set to which an embodiment is applied. The television set according to the present application example includes a video display screen section 101 made up, for example, of a front panel 102, filter glass 103 and other parts. The television set is manufactured by using the display device according to the embodiment as the video display screen section 101.

Figure 15A:
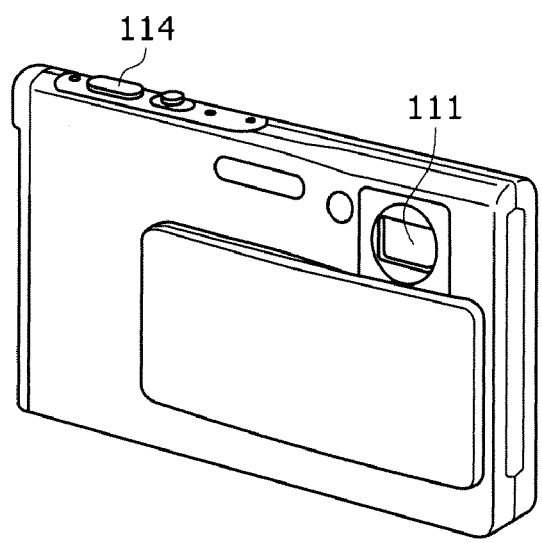
FIGS. 15A and 15B are perspective views illustrating a digital camera to which an embodiment is applied.
Figure 15B:
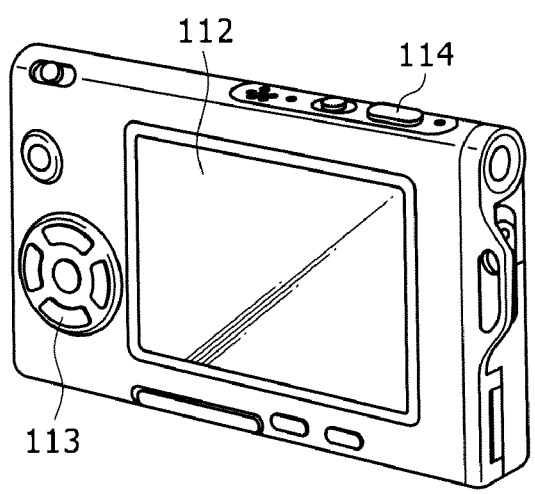

FIGS. 15A and 15B are views illustrating a digital camera to which an embodiment is applied. FIG. 15A is a perspective view of the digital camera as seen from the front, and FIG. 15B is a perspective view thereof as seen from the rear. The digital camera according to the present application example includes a flash-emitting section 111, display section 112, menu switch 113, shutter button 114 and other parts. The digital camera is manufactured by using the display device according to the embodiment as the display section 112.

Figure 16:
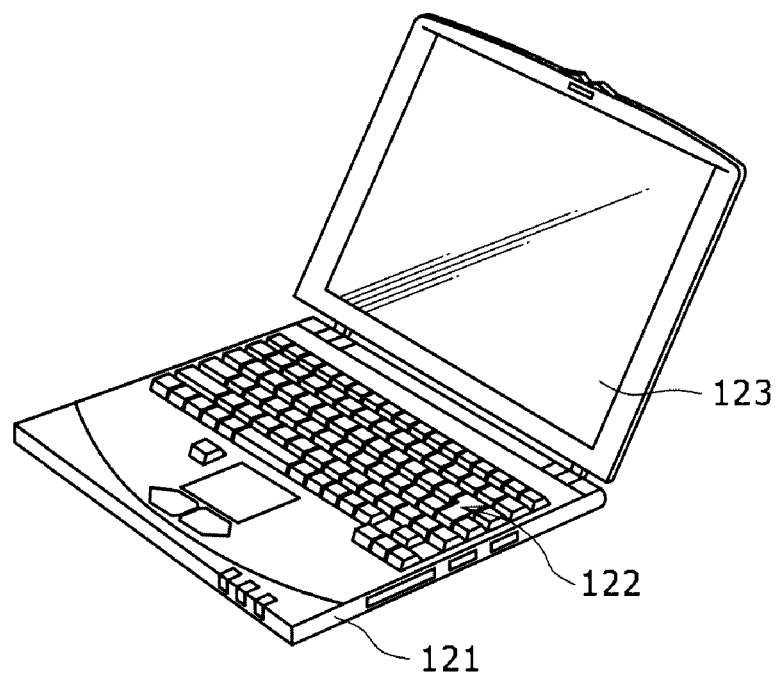
FIG. 16 is a perspective view illustrating a laptop personal computer to which an embodiment is applied.

FIG. 16 is a perspective view illustrating a laptop personal computer to which an embodiment is applied. The laptop personal computer according to the present application example includes, in a main body 121, a keyboard 122 adapted to be manipulated for entry of text or other information, a display section 123 adapted to display an image, and other parts. The laptop personal computer is manufactured by using the display device according to the embodiment as the display section 123.

Figure 17:
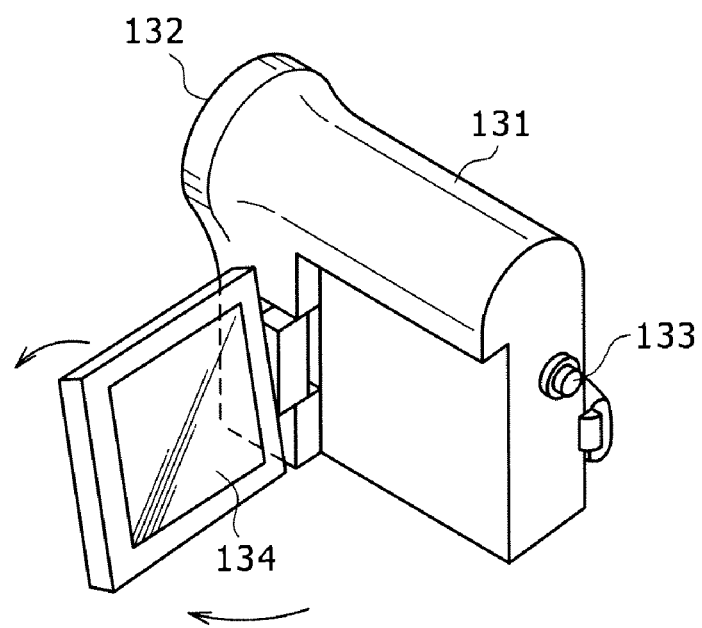
FIG. 17 is a perspective view illustrating a video camcorder to which an embodiment is applied.

FIG. 17 is a perspective view illustrating a video camcorder to which an embodiment is applied. The video camcorder according to the present application example includes a main body section 131, lens 132 provided on the front-facing side surface to capture the image of the subject, imaging start/stop switch 133, display section 134 and other parts. The video camcorder is manufactured by using the display device according to the embodiment as the display section 134.

FIGS. 18A to 18G are perspective views illustrating a personal digital assistant such as mobile phone to which an embodiment is applied. FIG. 18A is a front view of the mobile phone in an open position. FIG. 18B is a side view thereof. FIG. 18C is a front view of the mobile phone in a closed position. FIG. 18D is a left side view. FIG. 18E is a right side view. FIG. 18F is a top view. FIG. 18G is a bottom view. The mobile phone according to the present application example includes an upper enclosure 141, lower enclosure 142, connecting section (hinge section in this example) 143, display 144, subdisplay 145, picture light 146, camera 147 and other parts. The mobile phone is manufactured by using the display device according to the embodiment as the display 144 and subdisplay 145.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A display device comprising:
pixel electrodes, each of the pixel electrodes including
a plurality of electrode sections which are arranged parallel to each other, each electrode section being bent approximately in the middle along its extension direction in plan view,
a center connection portion adapted to connect the electrode sections together at their bent portions,
end connection portions adapted to connect together the electrode sections at their end portions, and
protruding portions each of which is formed by extending the end connection portion in such a manner as to protrude from the arranged electrode sections;
a substrate on which the pixel electrodes are arranged; and
an opposed substrate provided to face the side of the substrate on which the pixel electrodes are formed,
wherein an angle between two adjacent edges of at least one of the protruding portions is an acute angle or an obtuse angle.

2. The display device of claim 1, wherein
each of space portions enclosed by the electrode sections, center connection portion and end connection portion is parallelogramic, and
the inner angle on the inner angle side in the bending direction of the electrode sections and formed by the end connection portion is 90 degrees or less.

3. The display device of claim 1, wherein the electrode sections and center connection portion, and electrode sections and end connection portion are formed to be connected approximately perpendicular to each other.

4. The display device of claim 1, wherein each of space portions enclosed by the electrode sections, center connection portion and end connection portion is approximately rectangular in plan view.

5. The display device of claim 1, wherein
each of space portions enclosed by the electrode sections, center connection portion and end connection portion is parallelogramic, and
the inner angle on the inner angle side in the bending direction of the electrode sections of said pixel electrode and formed by the end connection portion is an acute angle less than 90 degrees.

6. The display device of claim 1, wherein a light-shielding pattern is provided to coincide with the center connection portion.

7. The display device of claim 1, wherein a common electrode is provided to be insulated from the pixel electrodes on the substrate on which the pixel electrodes are provided.

8. The display device of claim 7, wherein the pixel electrodes are stacked on the side of the common electrode via an insulating film.

9. A display device comprising:
scan lines;
signal lines intersecting with the scan lines; and
pixel electrodes, each of the pixel electrodes including
a plurality of electrode sections which are arranged parallel to each other, each electrode section being bent approximately in the middle along its extension direction in plan view,
a center connection portion adapted to connect the electrode sections together at their bent portions,
end connection portions adapted to connect together the electrode sections at their end portions, and
protruding portions each of which is formed by extending the end connection portion in such a manner as to protrude from the arranged electrode sections,
a substrate on which the pixel electrodes are arranged, and
an opposed substrate provided to face the side of the substrate on which the pixel electrodes are formed,
wherein the protruding portions extend in an extension direction of the scan lines without overlapping the signal lines.

10. A display device comprising:
scan lines;
signal lines intersecting with the scan lines; and
pixel electrodes, each of the pixel electrodes including
a plurality of electrode sections which are arranged parallel to each other, each electrode section being bent approximately in the middle along its extension direction in plan view,
a center connection portion adapted to connect the electrode sections together at their bent portions,
end connection portions adapted to connect together the electrode sections at their end portions, and
protruding portions each of which is formed by extending the end connection portion in such a manner as to protrude from the arranged electrode sections,
a substrate on which the pixel electrodes are arranged, and
an opposed substrate provided to face the side of the substrate on which the pixel electrodes are formed,
wherein the protruding portions extend in an extension direction of the scan lines, and an angle between at least one edge of at least one of the protruding sections and an extension direction of a signal line adjacent thereto is an acute angle or an obtuse angle.

* * * * *